Oct. 17, 1944.  R. L. LEADBETTER  2,360,429
SILENCER
Filed June 11, 1943    2 Sheets-Sheet 1
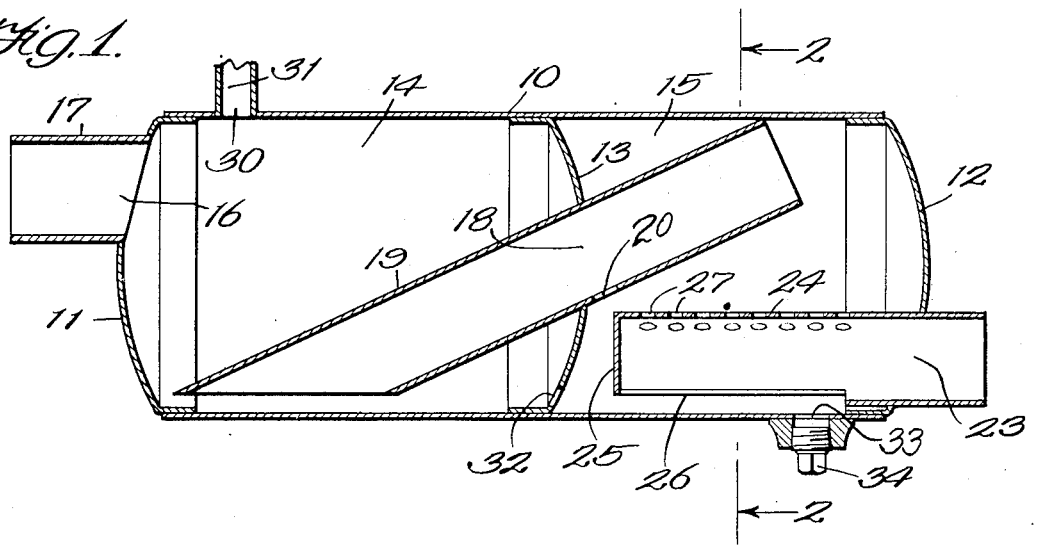
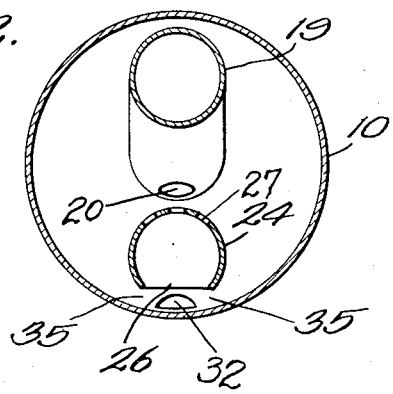
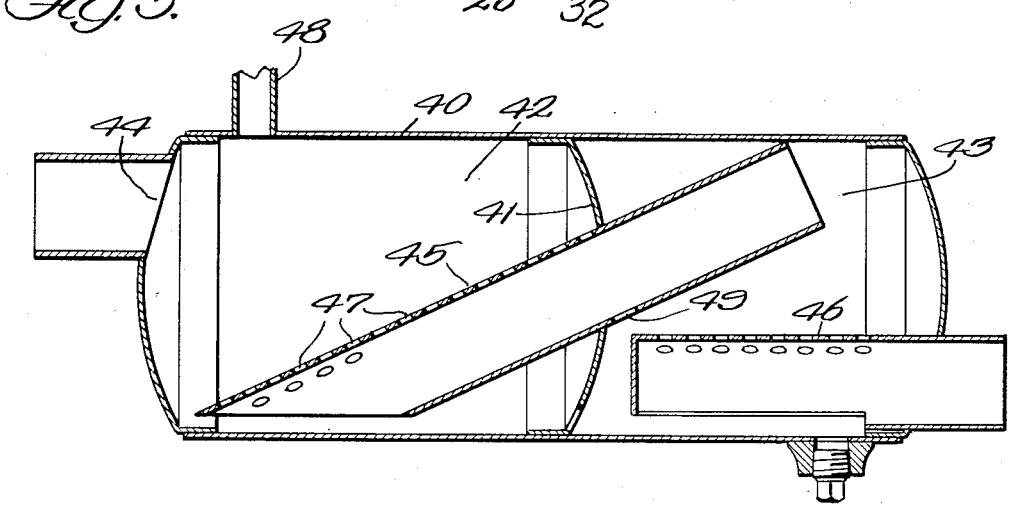
Inventor:
Ralph L. Leadbetter
By Jesch and Darbo
Attys.

Oct. 17, 1944.   R. L. LEADBETTER   2,360,429
SILENCER
Filed June 11, 1943   2 Sheets-Sheet 2

Inventor:
Ralph L. Leadbetter
By Jesch and Darbo
attys.

Patented Oct. 17, 1944

2,360,429

UNITED STATES PATENT OFFICE 2,360,429

SILENCER

Ralph L. Leadbetter, Wheaton, Ill., assignor, by mesne assignments, to Burgess-Manning Company, Chicago, Ill., a corporation of Illinois Application June 11, 1943, Serial No. 490,439

17 Claims. (Cl. 181—52)

This invention relates to silencers for internal combustion engines, and particularly to the marine, or wet, type of silencer which is adapted to have a liquid present within the silencer body during operation.

It is the object of the invention to provide a silencer of the type described which is highly effective for the silencing function and is simple and economical of construction.

In the drawings:

Fig. 1 is a longitudinal sectional view of a silencer in accordance with the invention;

Fig. 2 is a transverse sectional view along line 2—2 of Fig. 1; and

Figs. 3, 4 and 5 are longitudinal sectional views of different modifications of the silencer of the invention.

Figure 4:
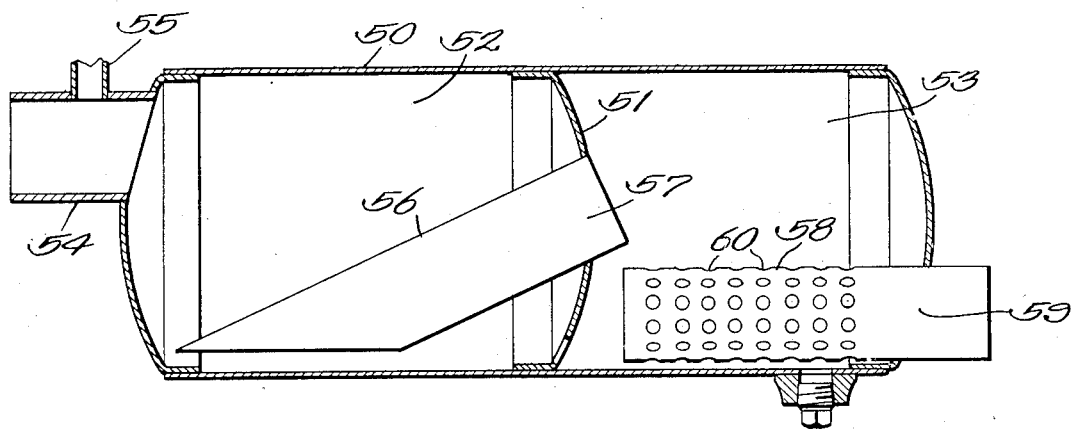

The silencer shown in Figs. 1 and 2 consists of a cylindrical shell 10 having inlet and outlet end walls 11 and 12 and a transverse partition 13 dividing the shell into an inlet chamber 14 and outlet chamber 15. The end walls and the partition may be suitably joined to the cylindrical shell, as by welding, and may be dished as shown to provide increased strength. The inlet chamber has an inlet openings 16 in the upper portion of inlet wall 11, to which an inlet conduit 17 is connected. Partition 13 has an opening 18 therein and an intermediate conduit 19 extends in a diagonally upward direction from a point in the lower portion of the inlet chamber 14 adjacent inlet end wall 11 through the opening 18 to a point in the upper portion of the outlet chamber 15. Conduit 19 is open at both ends and is cut off at the inlet end thereof in a plane substantially parallel to and adjacent the bottom of shell 10, i. e., the lowermost portion of the side wall of said shell. The circumferentially lowermost portion of the wall of conduit 19 has an opening 20 therein adjacent partition 13 and within the outlet chamber 15. Except for opening 20, the walls of conduit 19 are imperforate.

The outlet end wall 12 has an opening 23 therein adjacent the bottom of the shell 10, and an outlet conduit 24 passes through opening 23 and extends within the outlet chamber 15 to a point adjacent partition 13. The outlet conduit 24 is closed at the end thereof within the chamber 15 by a plate 25. The lowermost portion of the wall of conduit 24 is cut away to form a relatively wide slot 26 (see Fig. 2) which may extend for a large part of, or the entire, length of the conduit within chamber 15. The upper portion of the wall of conduit 24 is provided with a plurality of gas inlet openings 27.

The upper portion of the wall of inlet chamber 14 is provided with a liquid inlet opening 30, and a liquid inlet conduit 31 may be connected to the inlet opening 30 and adapted to convey liquid to the inlet chamber 14 from a suitable source of supply, which is not shown. An opening 32 is provided in the lowermost portion of partition 13, through which liquid may pass from the inlet chamber to the outlet chamber, and the bottom of the outlet chamber is provided with an opening 33, normally closed by a plug 34, which may be used to drain the liquid from the device during periods of inactivity. Opening 33 is preferably located adjacent the outlet end of the device, and the silencer is arranged in a slightly tilted position such that the outlet end is lower than the inlet end.

In operation, the inlet conduit 17 is connected to the exhaust of the internal combustion engine, and a liquid, usually water, is introduced into the inlet chamber by way of conduit 31. The rate of inflow of the liquid is regulated to be greater than the rate at which it will flow through opening 32 but less than the rate at which it will flow through openings 32 and 20 combined, so that when the engine is not running the liquid will build up in the inlet chamber 14 until it reaches the level of opening 20, and thereafter it will flow out of the inlet chamber through openings 20 and 32 as fast as it flows in. The liquid is free to flow out of outlet chamber 15 through slot 26 and conduit 24. The arrangement insures that the liquid will not flow into gas inlet conduit 17 and into the engine if the operator neglects to stop the supply of liquid when the engine is stopped.

The pulsating exhaust gases enter the inlet chamber by way of conduit 17. The entrance end of intermediate conduit 19 is covered by the liquid, and the pulsating gases meet the yielding pressure of the liquid and pass through the liquid and into the intermediate conduit. Considerable quantities of the liquid are projected through the conduit and into the outlet chamber 15 by the gases. Most of this liquid passes out of the outlet end of the conduit, while a small proportion passes out through opening 20.

Within the outlet chamber 15, the gases again encounter a body of liquid which substantially closes the slot 26. Some of the gases pass through this liquid and slot 26 into the outlet conduit 24, while the remainder passes through openings 27 in the upper portion of the walls of conduit 24. The liquid flows through slot 26 and out of the outlet chamber by way of conduit 24, a portion of it being expelled by the exhaust gases.

A silencer of the above character is very effective in the silencing of exhaust gases, and does not present excessive resistance to the gas flow. For the most effective results, the inlet end of the intermediate conduit should be adjacent, but not too closely adjacent, the bottom of the chamber, that is, the bottom portion of the inlet chamber side wall. The area of the entrance space to the conduit, that is, the space between the edges of the conduit and the adjacent portions of the chamber side wall should be at least approximately equal to the cross sectional area of conduit 19, and preferably does not exceed approximately 1½ times said cross sectional area. The area of the gas entrance openings into the outlet conduit 24 are likewise controlled. In the particular construction illustrated (see Fig. 2) the area of slot 26 is greater than the combined area of the two spaces 35 between the edges of the slot 26 and the wall of the chamber, so that the latter spaces control the flow, and their combined area is preferably between one and one and one-half times the cross sectional area of the conduit. The area of openings 27 in the upper portion of outlet conduit 24 is preferably restricted to approximately ½ the cross sectional area of the outlet conduit.

In a specific application of a silencer of the construction shown in Figs. 1 and 2, for use with a 2 cycle Diesel engine having 1 cylinder and a piston displacement of 71 cubic inches, and capable of developing a maximum brake horse power of approximately 15 at 1200 R. P. M., the shell 10 had a length of 22 inches (between the centers of the dished end walls) and a diameter of 8 inches; the inlet chamber had a length of 13 inches; all gas-conduits had an internal diameter of 2½ inches; the intermediate conduit was cut off at its inlet end in a plane substantially parallel to the bottom portion of the wall of the shell and was spaced ½ inch from such bottom portion; the slot 26 in outlet conduit 24 was 1½ inches wide by 6½ inches long; the spaces 35 between the edges of slot 26 and the shell wall were 1/16 inch wide (in a direction normal to the shell wall) and 6½ inches long, and the openings 27 in the upper portion of the wall of conduit 24 were confined to the upper one-third of the circumference of the conduit and were 3/8 inch in diameter and occupied a total area of approximately 2.75 square inches. The intermediate conduit and the outlet conduit were in overlapping relationship to each other for more than one-half of the length of the outlet conduit within the outlet chamber.

The device shown in Fig. 3 is similar to that shown in Figs. 1 and 2 except that it has perforations in the upper circumferential portion of the wall of the portion of intermediate conduit within the inlet chamber. It consists of a shell 40 divided by a transverse partition 41 into an inlet chamber 42 and an outlet chamber 43. A gas inlet opening 44 is provided for inlet chamber 42, and a diagonally arranged intermediate conduit 45 connects the two chambers, and an outlet conduit 46, similar to outlet conduit 24 of the device of Figs. 1 and 2, is arranged adjacent the bottom of outlet chamber 43. Intermediate conduit 45 has perforations 47 in the upper circumferential portion of the wall of the portion thereof located in inlet chamber 42, the total area of the perforations preferably being not more than approximately ½ of the cross sectional area of the conduit. The area of the perforations per unit area of wall is increased near the inlet end of the conduit, as by providing a larger number of perforations per unit of area, as shown in Fig. 3. Such construction insures that most of the gases pass through the liquid in entering the conduit. A liquid inlet opening 48 is provided in the upper portion of the wall of inlet chamber 42 and an opening 49 is provided in the lowermost circumferential portion of intermediate conduit adjacent partition 41 and within the outlet chamber.

The operation of this device is, in general, similar to that of the device of Figs. 1 and 2. The flow of gases into the intermediate conduit 45 is facilitated by the openings 47, and the result is that the resistance to gas flow is slightly less, while the silencing is slightly less effective than it is in the device of Figs. 1 and 2.

In the modification shown in Fig. 4, the diagonally arranged intermediate conduit does not extend into the outlet chamber, but stops substantially flush with the transverse partition, and the outlet conduit does not have a slot in its lower portion, but is open at both ends and perforated throughout substantially its entire circumference within the outlet chamber. The device consists of a shell 50 divided by a transverse partition 51 into an inlet chamber 52 and an outlet chamber 53. The inlet chamber is connected at its upper portion to an inlet conduit 54, and a liquid conduit 55 is connected to the gas inlet conduit 54 and is adapted to convey a supply of liquid to such conduit from whence it flows into the inlet chamber. The intermediate conduit 56 extends diagonally upward within the inlet chamber 52 to the opening 57 in partition 51 and stops substantially flush with the partition.

The outlet conduit 58 extends into the outlet chamber from outlet opening 59 and is arranged adjacent the bottom of the chamber. Outlet conduit 58 is open at both ends and has openings 60 distributed over substantially the entire circumference of the conduit. The total area of openings 60 is preferably from approximately 0.75 to approximately 1.5 times the cross sectional area of the conduit.

The operation of this modification is similar to that of the form shown in Figs. 1 and 2. The shorter intermediate tube presents slightly less resistance to the flow of gases, and the silencing effect is somewhat less than in the device of Figs. 1 and 2.

Figure 5:
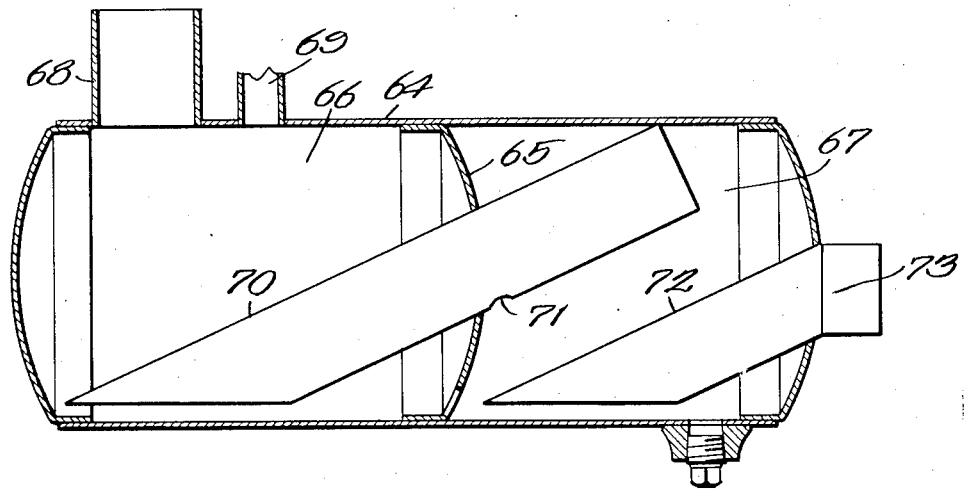

The modification shown in Fig. 5 has both the intermediate conduit and the outlet conduit extending in a diagonally upward direction. It consists of a shell 64 which is divided by a partition 65 into an inlet chamber 66 and an outlet chamber 67. A gas inlet conduit 68 and a liquid inlet conduit 69 are connected to openings in the top portion of the shell side wall and are adapted, respectively, to convey the engine exhaust gases and a liquid to the device. The intermediate conduit 70, similar to conduit 19 of the device shown in Figs. 1 and 2, extends diagonally upward from a point adjacent the bottom of the inlet chamber 66 through partition 65 to the upper portion of the outlet chamber 67. The conduit 70 has an opening 71 in the lowermost circumferential portion thereof adjacent partition 65 and within outlet conduit 67. The outlet conduit 72 extends diagonally upward from a point adjacent partition 65 and the bottom of outlet chamber 67 to an outlet opening 73 in the end wall of the shell. The inlet end of each of the intermediate and outlet conduits is cut off in a plane substantially parallel to and adjacent the bottom of the respective chambers as described in connection with the intermediate conduit 19 of the device of Figs. 1 and 2. The conduits 70 and 72 are arranged in mutually overlapping relationship in outlet chamber 67.

In operation, the inlet ends of conduits 70 and 72 are submerged in the liquid, and the exhaust gases pass through this liquid in their passage into the conduits, and expel a large proportion of the liquid through said conduits and out of the device during such passage.

Further modifications of the device may be made and the scope of the invention is limited only in accordance with the scope of the claims appended hereto.

I claim:

1. A silencer for pulsating gas streams, comprising a shell, a transverse partition having an opening therein dividing said shell into a gas inlet chamber and a gas outlet chamber, means for introducing liquid into said gas inlet chamber, said shell having a gas inlet opening therein and communicating with said inlet chamber and a gas outlet opening communicating with said outlet chamber, an open-ended intermediate conduit extending in a diagonally upward direction from a point within said inlet chamber to said opening in said partition, the inlet end of said conduit being cut off in a plane substantially parallel to and adjacent the bottom of said inlet chamber, and an outlet conduit communicating with said outlet opening and extending into said outlet chamber, at least a portion of said outlet conduit within said outlet chamber being adjacent the bottom of said outlet chamber and having at least one gas inflow opening therein.

2. A silencer construction in accordance with claim 1, in which the gas inlet opening is located in the upper portion of the shell.

3. A silencer construction in accordance with claim 1, in which the intermediate conduit extends into the outlet chamber and the intermediate and outlet conduits are arranged in mutually overlapping relation for a substantial portion of their length within the outlet chamber.

4. A silencer construction in accordance with claim 1, in which the intermediate conduit extends from a point within the inlet chamber to a point substantially flush with the partition.

5. A silencer construction in accordance with claim 1, in which the outlet conduit extends from the shell outlet opening diagonally downward to a point within the outlet chamber adjacent the bottom of said shell.

6. A silencer construction in accordance with claim 1, in which the outlet conduit has both ends thereof open and the portion thereof within the outlet chamber has a plurality of openings in the walls thereof.

7. A silencer construction in accordance with claim 1, in which drain openings are provided in the lowermost portion of the partition and the bottom wall of the outlet chamber.

8. A silencer construction in accordance with claim 1, in which the inlet end of the intermediate conduit is spaced from the bottom wall of the inlet chamber a distance such as to provide a gas entrance leading to said end of said conduit having an area not more than approximately one and one-half times the cross sectional area of said conduit.

9. A silencer construction in accordance with claim 1, in which the intermediate conduit has a plurality of openings in the upper circumferential portion thereof located in the inlet chamber.

10. A silencer for pulsating gas streams, comprising a shell, a transverse partition dividing said shell into a gas inlet chamber and a gas outlet chamber, means for introducing liquid into said gas inlet chamber, said shell having a gas inlet opening in the upper portion thereof and communicating with said inlet chamber and a gas outlet opening communicating with said outlet chamber, an open-ended intermediate conduit extending in a diagonally upward direction from a point within said inlet chamber adjacent the end thereof remote from said partition through said partition into said outlet chamber, the inlet end of said conduit being cut off in a plane substantially parallel to and adjacent the bottom portion of said inlet chamber, said conduit having an opening in the bottom circumferential portion of the wall thereof adjacent said partition and within said outlet chamber, and an outlet conduit communicating with said outlet opening and extending into said outlet chamber, a portion of said outlet conduit within said outlet chamber being adjacent the bottom of said outlet chamber and having at least one gas inflow opening in a wall thereof.

11. A silencer for pulsating gas streams, comprising a shell, a transverse partition dividing said shell into a gas inlet chamber and a gas outlet chamber, means for introducing liquid into said gas inlet chamber, said shell having a gas inlet opening in the upper portion thereof and communicating with said inlet chamber and a gas outlet opening adjacent the bottom thereof and communicating with said outlet chamber, an open-ended intermediate conduit extending in a diagonally upward direction from a point within said inlet chamber adjacent the end of said inlet chamber remote from said partition through said partition into said outlet chamber, the inlet end of said conduit being cut off in a plane substantially parallel to and adjacent the bottom of said inlet chamber, said conduit having a plurality of openings in the upper circumferential portion thereof located in said inlet chamber and an opening in the lowermost circumferential portion thereof adjacent said partition and within said outlet chamber, and an outlet conduit communicating with said outlet opening and extending into said outlet chamber in adjacent relation to the bottom of said outlet chamber, the portion of said outlet conduit within said outlet chamber having the end thereof closed and having a relatively large opening in the lower portion of the wall thereof and having a plurality of small openings in the upper portion of the wall thereof.

12. A silencer construction in accordance with claim 11, in which the outlet conduit is spaced a distance from the bottom of the shell and the opening in the lower portion of the outlet conduit is of a size to provide a gas entrance into said conduit having an area from approximately one to approximately one and one-half times the cross sectional area of said conduit.

13. A silencer construction in accordance with claim 11, in which the openings in the upper portion of the outlet conduit wall occupy an aggregate area equal to approximately one-half the cross sectional area of said conduit.

14. A silencer construction in accordance with claim 11, in which the openings in the upper circumferential portion of the intermediate conduit within the inlet chamber occupy an aggregate area equal to not more than approximately one-half the cross sectional area of said conduit.

15. A silencer construction in accordance with claim 11, in which the openings in the upper circumferential portion of the intermediate conduit are so arranged that the area of openings per unit of conduit wall area is greater in the portion of said conduit adjacent the inlet end thereof than in the portions remote from said end.

16. A silencer construction in accordance with claim 11, in which the inlet end of the intermediate conduit is spaced from the adjacent wall of the shell a distance such as to provide a gas entrance into said end of said conduit having an area from approximately one-half to approximately one and one-half times the cross sectional area of said conduit.

17. A silencer for pulsating gas streams, comprising a shell, a transverse partition having an opening therein dividing said shell into a gas inlet chamber and a gas outlet chamber, means for introducing liquid into said gas inlet chamber, said shell having a gas inlet opening therein communicating with said inlet chamber and a gas outlet opening therein communicating with said outlet chamber, an open-ended intermediate conduit extending in a diagonally upward direction from a point within said inlet chamber to said opening in said partition, the inlet end of said intermediate conduit being adjacent the bottom wall of said inlet chamber and spaced from said bottom wall a distance such as to provide a gas entrance leading to said end of said conduit having an area not more than approximately one and one-half times the cross sectional area of said conduit, and an outlet conduit communicating with said outlet opening and extending into said outlet chamber, at least a portion of said outlet conduit within said outlet chamber and having at least one gas inflow opening therein.

RALPH L. LEADBETTER.